(12) United States Patent
Kanagawa

(10) Patent No.: US 9,742,168 B2
(45) Date of Patent: Aug. 22, 2017

(54) CONDUCTIVE PATH

(71) Applicant: SUMITOMO WIRING SYSTEMS, LTD., Yokkaichi-shi, Mie (JP)

(72) Inventor: Shuichi Kanagawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 14/830,022

(22) Filed: Aug. 19, 2015

(65) Prior Publication Data

US 2016/0064907 A1  Mar. 3, 2016

(30) Foreign Application Priority Data

Sep. 3, 2014  (JP) .................................. 2014-178672

(51) Int. Cl.
  *H02G 3/04* (2006.01)
  *B60R 16/02* (2006.01)
  *H02G 3/06* (2006.01)

(52) U.S. Cl.
  CPC ....... *H02G 3/0462* (2013.01); *B60R 16/0215* (2013.01); *H02G 3/0616* (2013.01)

(58) Field of Classification Search
  CPC .. H05K 9/007; H05K 9/0098; B60R 16/0215; H02G 3/0487; H02G 3/0406; H02G 3/0462
  USPC .................................. 174/72 A, 68.1, 133 R
  See application file for complete search history.

(56) References Cited

U.S. PATENT DOCUMENTS

| | | | | |
|---|---|---|---|---|
| 6,376,773 B1* | 4/2002 | Maegawa | ............... | H01R 12/63 174/117 F |
| 8,936,187 B2* | 1/2015 | Hino | ...................... | H01R 43/02 228/112.1 |
| 2012/0312595 A1* | 12/2012 | Sawada | ............... | B60R 16/0215 174/72 A |
| 2013/0248246 A1* | 9/2013 | Oga | ..................... | B60R 16/0207 174/72 A |
| 2014/0110459 A1* | 4/2014 | Kataoka | ................. | H01R 4/021 228/111 |
| 2014/0353361 A1* | 12/2014 | Numata | ............. | H01R 43/0207 228/110.1 |

FOREIGN PATENT DOCUMENTS

JP  2012-222888 A  11/2012

* cited by examiner

*Primary Examiner* — Dimary Lopez Cruz
(74) *Attorney, Agent, or Firm* — Oliff PLC

(57) ABSTRACT

A conductive path is provided that enables easily connecting stranded electrical lines to a plurality of single-core electrical lines collectively inserted into a pipe. The conductive path includes a plurality of single-core electrical lines, each being made up of one single-core conductor enveloped in an insulating sheathing, and a shield pipe into which the single-core electrical lines are collectively inserted. An end portion of each of the single-core conductors is a junction portion to which a stranded electrical line is to be connected, the stranded electrical line including a stranded conductor made up of a plurality of twisted individual wires, and an insulating sheathing that envelops the stranded conductor. The junction portions of the single-core electrical lines are arranged in the longitudinal direction with respect to each other outside of the shield pipe.

12 Claims, 5 Drawing Sheets

CONDUCTIVE PATH

TECHNICAL FIELD

The exemplary embodiments relate to a conductive path.

BACKGROUND ART

Conventionally, in vehicles such as hybrid vehicles, there are cases in which multiple electrical lines are routed under the bottom of the vehicle in order to connect devices installed in the back part of the vehicle, such as high-voltage batteries, to devices installed in the front part of the vehicle, such as inverters and fuse boxes. In this regard, a technique is known in which electrical wires are inserted into a metallic pipe to not only electromagnetically shield them, but also protect them from interference by foreign objects (e.g., see JP 2012-222888A). The electrical lines are generally stranded electrical lines, which are stranded line conductors that are made up of multiple individual twisted wires and enveloped in an insulating sheathing, and can be freely bent for routing. Also, at the end portion region of the conductive path that is routed such that it weaves through the gaps surrounding the device, the electrical lines are enveloped with a shield member having flexibility, such as a metal braided portion made up of individual metal wires that are netted into a tubular shape, instead of a pipe with high rigidity.

JP 2012-222888A is an example of related art.

SUMMARY

Incidentally, considering the minimum ground clearance, there is demand for reducing the diameter dimension of the pipe as much as possible in the conductive path routed under the bottom of the vehicle. In view of this, rather than using the above stranded electrical line, it is conceivable to change the electrical lines to single-core electrical lines, which include a single-core conductor that has been enveloped in an insulating sheathing. In doing so, the diameter dimension of the electrical line itself can be reduced, and since the single-core electrical line does not flex easily, the electrical lines can be inserted into a pipe with a small diameter dimension, and therefore the diameter dimension of the pipe can be reduced. Also, at the end portion regions of the conductive path that requires flexibility, it is conceivable that this can be accommodated for by connecting stranded electrical lines, which flex easily, to the end portions of the single-core electrical lines.

In this case, it is envisioned that after the single-core electrical lines have been inserted into the pipe, the stranded electrical lines are connected to the end portions of the single-core electrical lines that have been drawn out of the pipe, by a method such as soldering or welding. This because if the junction portion between the single-core electrical line and the stranded electrical line, which is prone to having a larger width dimension, is connected first, the junction portion needs to be inserted into the pipe, and it becomes more difficult to reduce the diameter dimension of the pipe.

However, it is thought that the task of connecting stranded electrical lines to the end portions of multiple single-core electrical lines drawn out from the pipe is not easy, and there has been a desire for a solution.

The exemplary embodiments have been achieved in light of the above-described circumstances, and an object thereof is to provide a conductive path that allows easy connection of the stranded electrical lines to the single-core electrical lines that have been collectively inserted into the pipe.

A conductive path according to the exemplary embodiments include: a plurality of single-core electrical lines, each being made up of one single-core conductor enveloped in an insulating sheathing; and a pipe into which the plurality of single-core electrical lines are collectively inserted, wherein an end portion of each of the single-core conductors is a junction portion to which a stranded electrical line is to be connected, the stranded electrical line including a stranded conductor made up of a plurality of twisted individual wires, and an insulating sheathing that envelops the stranded conductor, and the junction portions of the plurality of single-core electrical lines are arranged in a longitudinal direction with respect to each other outside of the pipe.

According to the present exemplary embodiments, the positions of the junction portions of the plurality of single-core electrical lines are arranged in the longitudinal direction, and therefore the task of connecting stranded electrical lines to the junction portions can be performed more easily than in the case where the junction portions are arranged lined up, and the increase in the width dimension of the conductive path caused by arranging the junction portions lined up can be prevented.

DETAILED DESCRIPTION OF THE EXEMPLARY EMBODIMENTS

The following describes exemplary embodiments.

In a conductive path of an exemplary embodiment, a flat fixing surface to which the stranded conductor is to be fixed, may be formed on each of the junction portions. According to this configuration, the task of mounting and connecting the stranded electrical conductors to the flat fixing surfaces can be performed, and therefore connecting the stranded electrical lines to the plurality of single-core electrical lines collectively inserted into the pipe can be performed with ease.

Also, in the conductive path of the present exemplary embodiment, facing surfaces shaped so as to be able to face each other via an approximately uniform gap between the single-core electrical lines may be formed on portions of the plurality of single-core electrical lines that are arranged inside the pipe, so as to restrict individual rotation of the single-core electrical lines, and the fixing surfaces may be formed on the same side in the plurality of single-core electrical lines. According to this configuration, the diameter dimension of the pipe can be reduced by reducing the size of gaps formed between the single-core electrical lines within the pipe, and the stranded electrical lines can be easily connected to the single-core electrical lines.

Also, in the conductive path of the present exemplary embodiment, the pipe may be a shield pipe with a shield function, and junction portions between the single-core conductors and the stranded conductors may be collectively covered with a shield member.

Embodiments

The following is a detailed description of an exemplary embodiment with reference to FIGS. 1 to 4.

Figure 1:
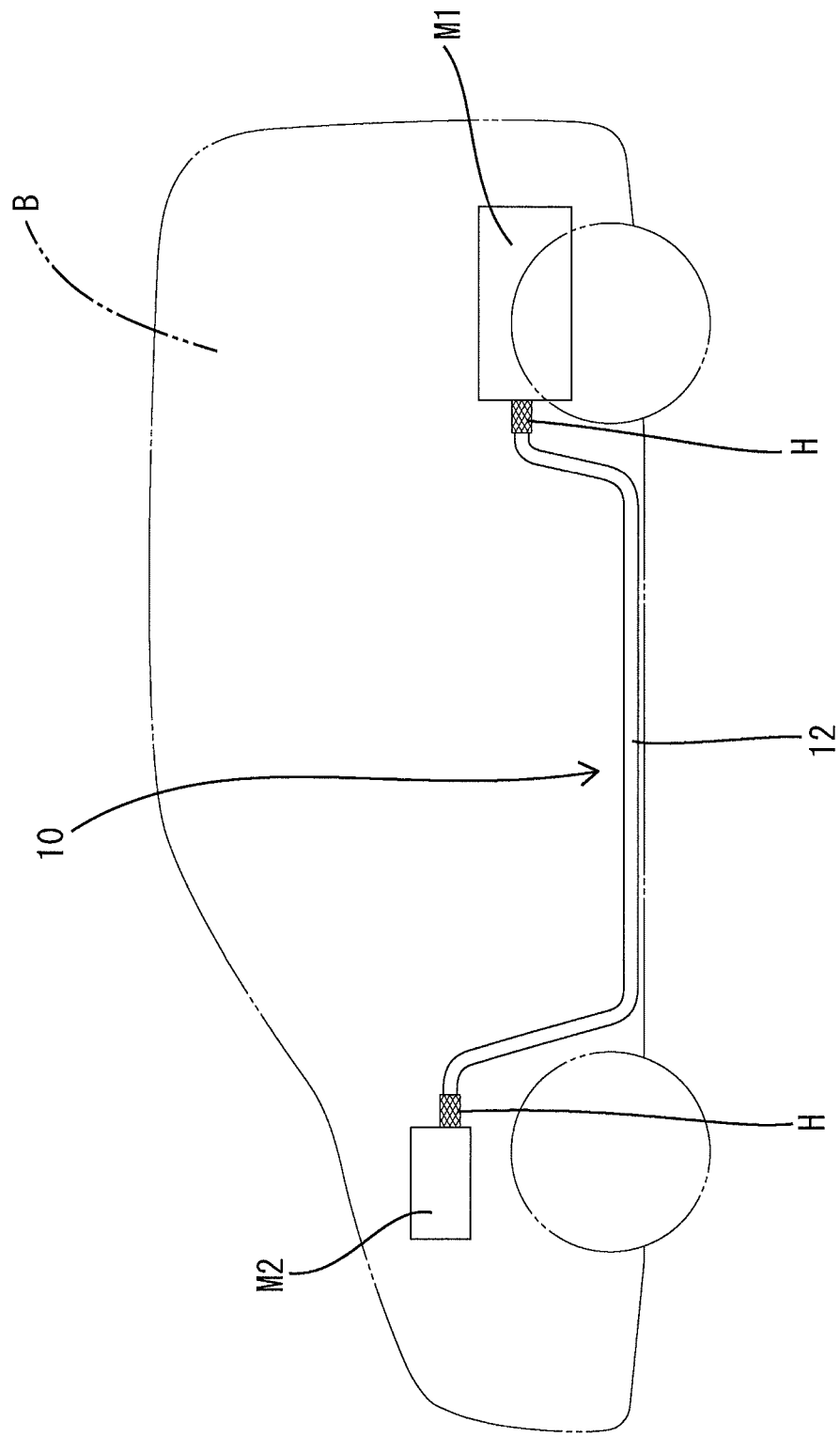
FIG. 1 is a schematic side view showing a routing path for a conductive path according to a first exemplary embodiment.

In a vehicle B such as a hybrid vehicle, a conductive path 10 of the present embodiment is routed under the bottom of the vehicle B in order to connect a device M1 installed in the back part of the vehicle B, such as a high-voltage battery, to a device M2 installed in the front part of the vehicle B, such as an inverter or fuse box (See FIG. 1). Note that each of the devices M1 and M2 is contained within a conductive shield case.

The conductive path 10 of the present embodiment is a shield conductive path that includes a pipe made of a metal (hereinafter referred to as "shield pipe 12") with shield functionality into which multiple single-core electrical lines 11 (two in the present embodiment) are collectively inserted.

The electrical lines 11 are each a non-shielded electrical line that is made up of a single-core conductor 11A, which is made up of a single metal rod, and an insulating sheathing 11B that envelops the outer circumference of the single-core conductor 11A. The single-core conductor 11A is formed with copper, a copper alloy, aluminum or an aluminum alloy, has relatively high rigidity and does not easily flex. The cross-sectional areas of the two single-core electrical lines 11 (single-core conductors 11A) are the same.

Figure 4:
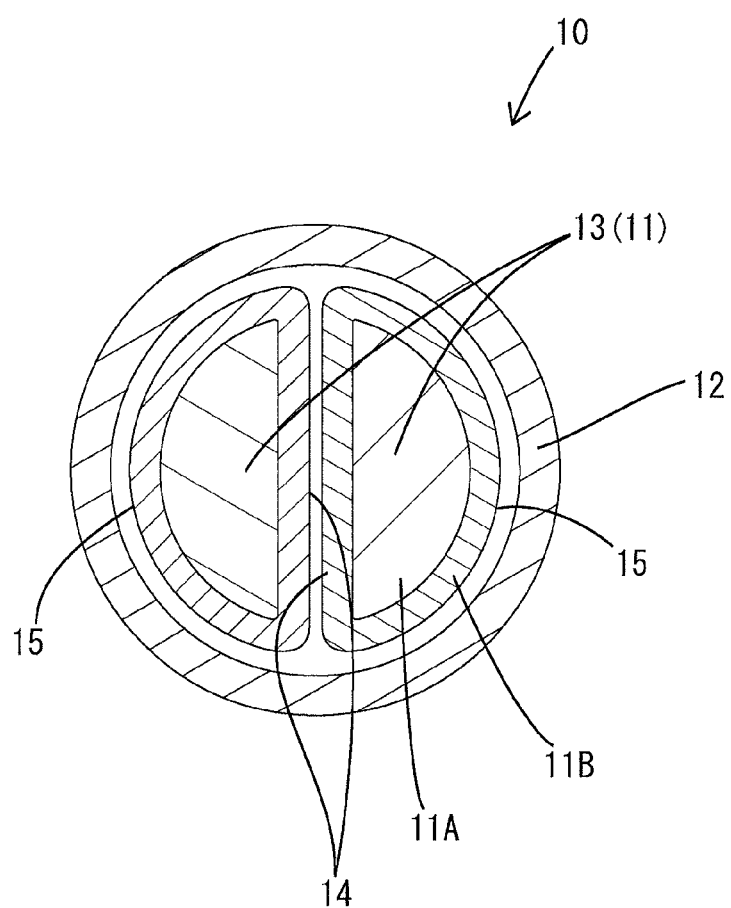
FIG. 4 is a cross-sectional view showing the cross-sectional shape of a shield conductive path.

The shield pipe 12 is made of a metal, such as iron, aluminum, copper or stainless steel, is in a cylindrical form so as to be able to collectively envelop the two electrical lines 11, and has a perfect circle cross-sectional shape (see FIG. 4). The shield pipe 12 undergoes bending in a 3D direction into a bent shape in accordance with the routing path of the single-core electrical lines 11. Note that other than a metallic pipe, the shield pipe 12 may be an electrically conductive resin pipe.

As shown in FIG. 4, the cross-section of the portion of each of the two single-core electrical lines 11 arranged within the shield pipe 12 (hereinafter referred to as "pipe-insertion portion 13") is roughly a semi-circle shape obtained by bisecting the inner space of the shield pipe 12 with a flat surface. The cross-sectional shape of the pipe-insertion portion 13 forms the cross-sectional shape of the single-core conductor 11A into a semi-circular shape, and is formed by enveloping the outer circumference of the single-core conductor 11A with the insulating sheathing 11B that has a constant thickness dimension.

Also, facing surfaces 14 shaped so as to be able to face each other via an approximately uniform gap are formed on the pipe-insertion portions 13 of the two single-core electrical lines 11. Each facing surface 16 is a flat surface with no irregularities, and the facing surfaces 16 are arranged so as to face each other and be approximately parallel to each other between the adjacent single-core electrical lines 11.

Also, an outer circumferential face 15 shaped so as to be able to face the inner circumferential face of the shield pipe 12 is formed on each of the pipe-insertion portions 13. Each outer circumferential surface 15 has a circular arc shape that follows the inner circumferential face of the shield pipe 12, and is arranged so as to be approximately parallel to the inner circumferential surface of the shield pipe 12.

The two single-core electrical lines 11 are arranged within the shield pipe 12 such that the facing surfaces 14 face each other. As a whole, the two pipe-insertion portions 13 arranged within the shield pipe 12 form a circular cross-sectional shape. The outer circumferential surface 15 of each of the single-core electrical lines 11 (pipe-insertion portions 13) and the inner circumferential surface of the shield pipe 12 are separated by only the minimal required gap for insertion of the single-core electrical lines 11.

Figure 2:
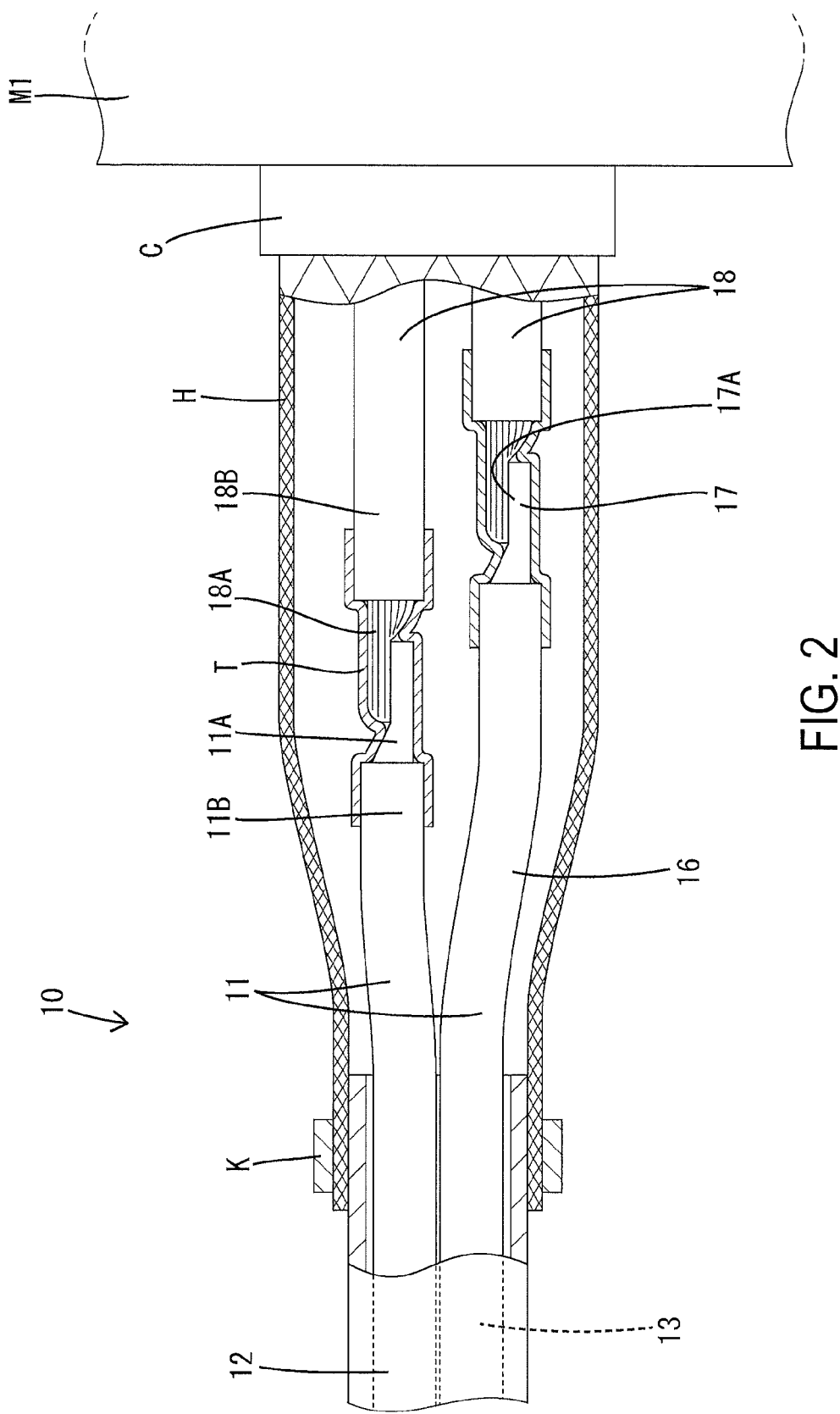
FIG. 2 is a side cross-sectional view showing an enlargement of a region including a junction portion between a single-core electrical line and a stranded electrical line.
Figure 3:
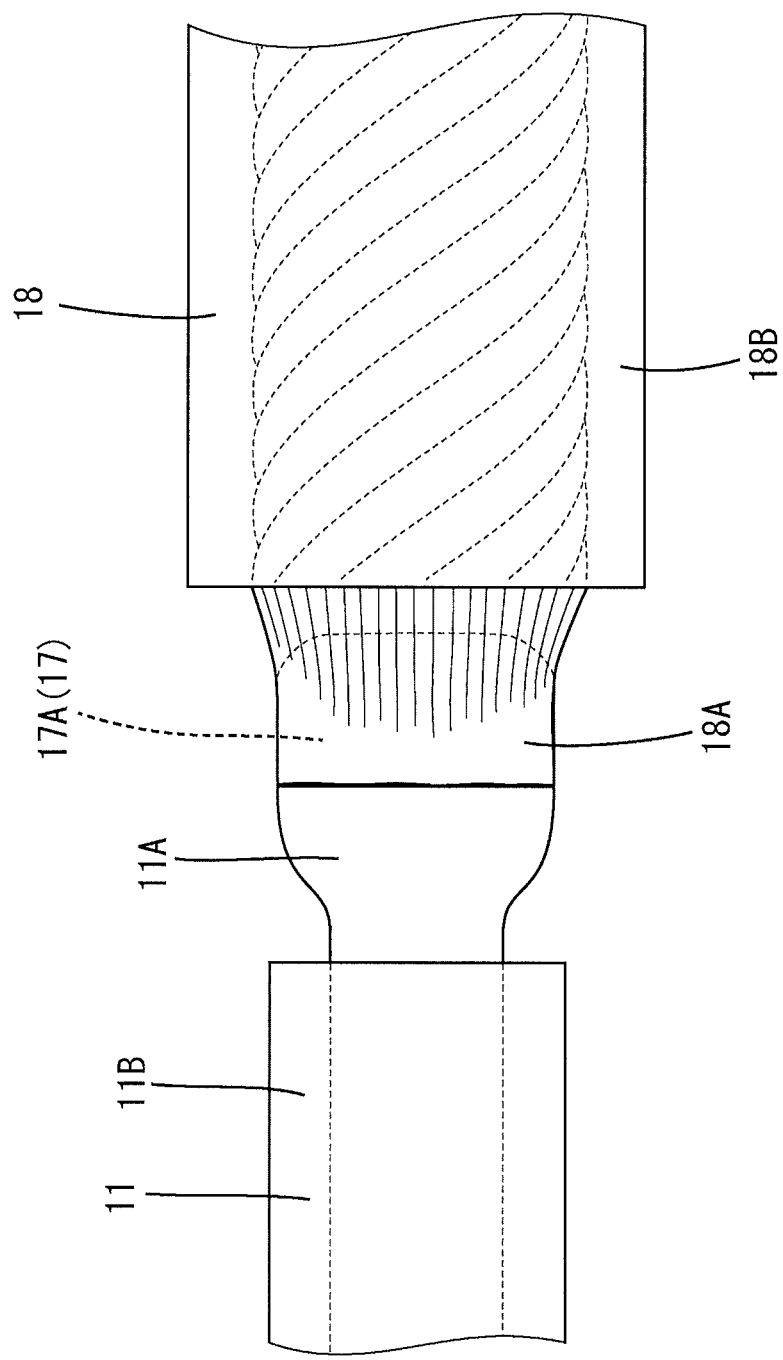
FIG. 3 is a plan view showing an enlargement of a junction portion between the single-core electrical line and the stranded electrical line.

As shown in FIG. 2, the end portions of the single-core electrical lines 11 are drawn out from the shield pipe 12. Note that below, the portion of the single-core electrical line 11 drawn out from the shield pipe 12 will be referred to as a pipe-external portion 16.

The insulating sheathing 11B is stripped from the end portions of the pipe-external portions 16 of each of the single-core electrical lines 11 over a range having a predetermined length, and the single-core conductor 11A is exposed. The end portion of the single-core conductor 11A is a junction portion 17, to which a stranded conductor 18A of a stranded electrical line 18 is connected.

The length dimensions of the pipe-external portions 16 of the single-core electrical lines 11 are different between the two single-core electrical lines 11, and the junction portions 17 of the single-core electrical lines 11 are arranged so as to be connected in the longitudinal direction outside the shield pipe 12.

The junction portion 17 of the single-core conductor 11A is collapsed from one side to form a cross-sectional rectangular shape that is thinner than the pipe-insertion portion 13. A flat fixing surface 17A, to which the stranded conductor 18A is to be fixed, is provided on the junction portion 17. As shown in FIG. 2, the fixing surfaces 17A are formed so as to face in the same direction in the two single-core electrical lines 11A. Also, the fixing surfaces 17A on the two single-core electrical lines 11 are arranged and connected in the axial direction.

Each stranded electrical line 18 is a non-shielded electrical line that includes a stranded conductor 18A that is made up of multiple individual wires twisted into a helix, and an insulating sheathing 18B that envelops the outer circumference of the stranded conductor 18A. Each individual line is formed with copper or a copper alloy, or with aluminum or an aluminum alloy. The stranded electrical line 18 has low rigidity and easily flexes.

The insulating sheathing 18B is stripped from the two end portions of the stranded electrical line 18 over a range having a predetermined length, and the stranded conductor 18A is exposed. The end portion on one end side of the stranded electrical line 18 is joined to the fixing surface 17A of the single-core conductor 11A by a method such as soldering or welding, and the end portion on the other end side is connected to a terminal metal fitting that is not illustrated. Each of the terminal metal fittings is housed in a connector C, and by mating a connector of either the device M1 or M2 to the connector C, an electrical connection can be made with the device M1 or M2 side.

A heat shrink tube T covers the entire circumference of the connection points between the single-core electrical line 11 and the stranded electrical line 18. The heat shrink tube T is placed such that it spans between the insulating sheathing 11B of the single-core electrical line 11 and the insulating sheathing 18B of the stranded electrical line 18. Accordingly, the junction portion between the single-core electrical line 11 and stranded electrical line 18 is maintained in a sealed state and insulating state.

The pipe-external portion 16 of the stranded electrical line 11 and the portion of the stranded electrical line 18 drawn out from the connector C are collectively enveloped with a braided member H. The braided member H is made with a thin metallic wire that has electric conductive properties, such as copper, and is weaved into a mesh, then formed into a tubular shape. Note that enveloping may be performed with a metallic foil or a metallic foil with a slit instead of the braided member H.

One end side of the braided member H is swaged to the outer circumferential surface 15 of the shield pipe 12 with a metallic band K so as to be fixedly attached and allow conduction, and the other end side is fixedly attached to the connector C so that conduction is possible.

Next is a description of an example of the task of manufacturing the shield conductive path 10 of the present embodiment.

First, the two single-core electrical lines 11 are inserted into the shield pipe 12. The two electrical lines that have a predetermined length dimension are bundled and inserted into the shield pipe 12 so that the facing surfaces 14 face each other. Then, the end portions of the single-core electrical lines 11 are drawn out to a predetermined length dimension and fixed. At this time, the task of inserting can be done comparatively easily because the single-core electrical lines 11 do not flex easily compared to the stranded electrical lines 18.

Next, the stranded electrical lines 18 are connected to the end portions of the single-core electrical lines 11. At this time, the connection task can be performed easily because the fixing surfaces 17A of the single-core electrical lines 11 are facing the same direction, compared to a case in which, for example, the fixing surfaces of two single-core electrical lines are facing opposite directions. Also, the stranded conductor 18A can be set in a stable manner to the fixing surface 17A because the fixing surface 17A is a flat surface.

Then the shield pipe 12 undergoes bending into a predetermined shape.

This completes the task of manufacturing the shield conductive path 10.

Next is a description of the actions and effects of the present embodiment as configured above.

The shield conductive path 10 of the present embodiment includes single-core electrical lines 11 that are each made up of one single-core conductor 11A enveloped in the insulating sheathing 11B, and a shield pipe 12 into which the single-core electrical lines 11 are collectively inserted. An end portion of each of the single-core conductors 11A is a junction portion 17 to which a stranded electrical line 18 is to be connected, the stranded electrical line 18 including a stranded conductor 18A made up of a plurality of twisted individual wires, and an insulating sheathing 18B that envelops the stranded conductor 18A. The junction portions 17 of the single-core electrical lines 11 are arranged in the longitudinal direction with respect to each other outside of the shield pipe 12. According to this configuration, the task of connecting the stranded electrical lines 18 to the junction portions 17 can be performed more easily than in the case where the junction portions 17 are arranged lined up, and the increase in the width dimension of the shield conductive path 10 caused by arranging the junction portions 17 lined up can be prevented.

Also, a flat fixing surface 17A to which the stranded conductor 18A is to be fixed is formed on each junction portion 17. According to this configuration, the task of mounting and connecting the stranded electrical conductors 18A to the flat fixing surfaces 17A can be performed, and therefore connecting the stranded electrical lines 18 to the plurality of single-core electrical lines 11 collectively inserted into the shield pipe 12 can be performed with ease.

Also, facing surfaces 14 shaped so as to be able to face each other via an approximately uniform gap are formed on portions of the single-core electrical lines 11 that are arranged inside the shield pipe 12, so as to restrict individual rotation of the single-core electrical lines 11, and the fixing surfaces 17A are formed on the same side in the single-core electrical lines 11. According to this configuration, the diameter dimension of the shield pipe 12 can be reduced by reducing the size of gaps formed between the single-core electrical lines 11 within the shield pipe 12, and the stranded electrical lines 18 can be easily connected to the single-core electrical lines 11.

Also, the external circumferential surface 15 shaped so as to be able to face the inner circumferential surface of the shield pipe 12 via an approximately uniform gap is formed on each pipe-insertion portion 13 of each single-core electrical line 11. According to this configuration, the diameter of the shield pipe 12 can be reduced because the size of the gap between the shield pipe 12 and the single-core electrical lines 11 that are inserted into the shield pipe 12 can be reduced.

Other Embodiments

The claimed subject matter is not limited to the above exemplary embodiment described using the above description and diagrams, and other exemplary embodiments such as the following, also fall under the technical scope of the claimed subject matter.

Figure 5:
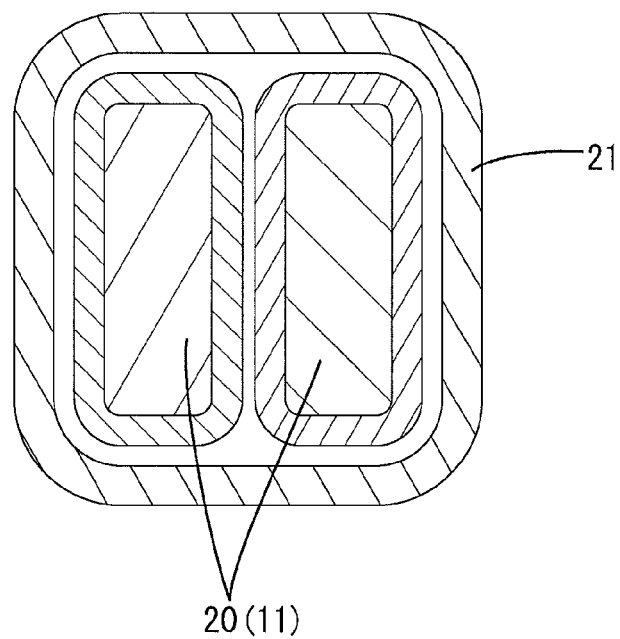
FIG. 5 is a cross-sectional view showing the cross-sectional shape of the shield conductive path according to another embodiment (1)

1) In the above exemplary embodiment, the cross-section of each of the pipe-insertion portions 13 of the single-core electrical lines 11 is a semi-circle shape, and the pipe-insertion portions 13 are inserted into the shield pipe 12 whose cross-sectional shape is a perfect circle, but there is no limitation to this, the cross-sectional shapes of the single-core electrical lines and the shield pipe can be changed as necessary, and a configuration is possible in which, as shown in FIG. 5, the cross-sectional shapes of the pipe-insertion portions 20 of the single-core electrical lines 11 are rectangular, and the pipe-insertion portions 20 are inserted into the shield pipe 21 with a cross-sectional shape that is close to a square for example.

Figure 6:
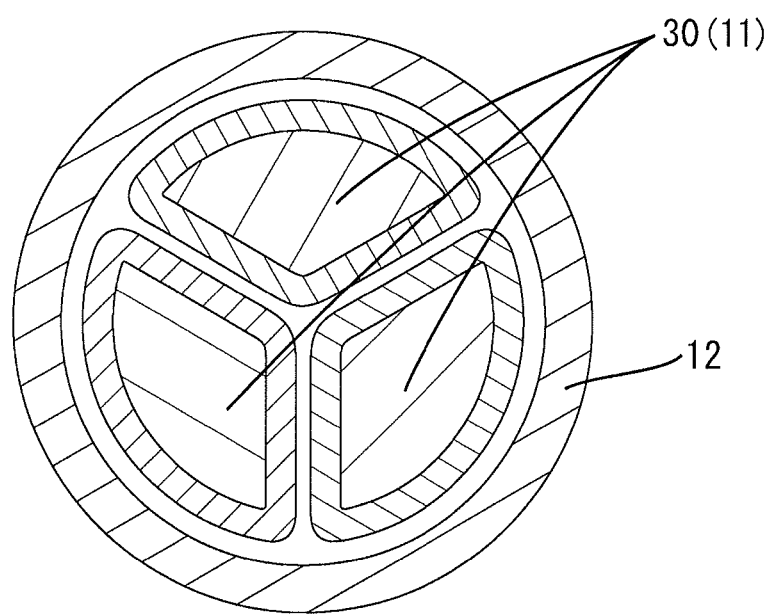
FIG. 6 is a cross-sectional view showing the cross-sectional shape of the shield conductive path according to another embodiment (2).

2) In the above exemplary embodiment, two single-core electrical lines 11 are inserted into the shield pipe 12, but there is no limitation to this, and there may be three or more of the single-core electrical lines 11. In such a case, the cross-sectional shapes of the pipe-insertion portions of the single-core electrical lines may be shapes obtained by appropriately dividing the inner space of the shield pipe according to the number of single-core electrical lines, and in the case where there are three single-core electrical lines as shown in FIG. 6 for example, the cross-sections of the pipe-insertions 30 of the single-core electrical lines 11 are fan shapes obtained by trisecting the inner space of the shield pipe 12 with flat surfaces that form a radiating shape from the center.

3) In the above exemplary embodiment, the cross-sectional shapes of the pipe-insertion portions of the two single-core electrical lines 11 are approximately the same, but there is no limitation to this, and the pipe-insertion portions may have different cross-sectional shapes.

4) In the above exemplary embodiment, the facing surfaces 14 of the pipe-insertion portions 13 are flat surfaces, but there is no limitation to this, and it is sufficient that the facing surfaces are shaped so as to be able to face each other via an approximately uniform gap in adjacent single-core electrical lines, and the facing surfaces may be surfaces that gently curve in the same direction, for example.

5) In the above exemplary embodiment, the cross-sectional shape of the shield pipe 12 is a perfect circle, but there is no limitation to this, and the external shape of the shield pipe may take any shape, such as an ellipse. Also, in the case where the shield pipe has a horizontally long cross-section, the pipe-insertion portions of the single-core electrical lines may be lined up in the lengthwise direction of the cross-section.

6) In the above exemplary embodiment, facing surfaces 14 shaped so as to be able to face each other via an approximately uniform gap are formed on the pipe-insertion portions of the two single-core electrical lines 11, which are arranged within the shield pipe 12, but there is no limitation to this, and the cross-sectional shape of the pipe-insertion portion of the single-core electrical line may be a general circular shape.

7) In the above exemplary embodiment, the junction portion 17 has a cross-sectional rectangular shape that is thinner than the pipe-insertion portion 13, but there is no limitation to this, and the cross-sectional shape of the junction portion may take any shape, and for example, the cross-sectional shape of the junction portion may be approximately the same as the cross-sectional shape of the pipe-insertion portion.

8) In the above exemplary embodiment, the case in which single-core electrical lines are inserted into a shield pipe with a shield function is described, but the present exemplary embodiment can also be applied to single-core electrical lines that are inserted into a pipe that only has a protective function and does not have a shield function, such as a resin pipe.

LIST OF REFERENCE NUMERALS

H Braided member (collective shield member)
10 Conductive path
11 Single-core electrical line
11A Single-core conductor
11B Insulating sheathing
12, 21 Shield pipe (pipe)
13, 20, 30 Pipe-insertion portion (portion arranged inside a pipe)
14 Facing surface
17 Junction portion
17A Fixing surface
18A Stranded conductor

What is claimed is:

1. A conductive path for connection to a connector, the conductive path comprising:
   a pipe having an opening;
   a plurality of stranded electrical lines that are each formed of a stranded conductor comprised of a plurality of twisted individual wires, the stranded conductor being enveloped in an insulating sheathing;
   a plurality of single-core electrical lines that are each formed of a single-core conductor enveloped in an insulating sheathing, the plurality of single-core electrical lines being collectively inserted within the pipe, and an end portion of each of the single-core conductor including:
      a junction portion connecting at least one stranded electrical line, each junction portion of the plurality of single-core electrical lines being arranged in a longitudinal direction with respect to each other outside of the pipe such that each junction portion is disposed between the opening of the pipe and the connector; and
   a heat shrink tube enveloping only: (i) an end portion of the single-core conductor, (ii) an entirety of the junction portion, and (iii) an end portion of the stranded conductor.

2. The conductive path according to claim 1, wherein a flat fixing surface is formed on each of the junction portions, where the stranded conductor is fixed to the flat fixing surface.

3. The conductive path according to claim 2, wherein
   facing surfaces shaped so as to be able to face each other via an approximately uniform gap between the single-core electrical lines are formed on portions of the plurality of single-core electrical lines arranged inside the pipe, so as to substantially restrict individual rotation of the single-core electrical lines, and
   the fixing surfaces are formed on the same side in the plurality of single-core electrical lines.

4. The conductive path according to claim 3, wherein
   the pipe is a shield pipe configured to shield an interior area within the pipe, and
   junction portions between the single-core conductors and the stranded conductors are collectively covered with a shield member.

5. The conductive path according to claim 4, wherein
   the shield member is a braided member connected to the connector, and
   the braided member is connected to the opening of the pipe by a metallic band.

6. The conductive path according to claim 2, wherein
   the pipe is a shield pipe configured to shield an interior area within the pipe, and
   junction portions between the single-core conductors and the stranded conductors are collectively covered with a shield member.

7. The conductive path according to claim 6, wherein
   the shield member is a braided member connected to the connector, and
   the braided member is connected to the opening of the pipe by a metallic band.

8. The conductive path according to claim 1, wherein
   the pipe is a shield pipe configured to shield an interior area within the pipe, and
   junction portions between the single-core conductors and the stranded conductors are collectively covered with a shield member.

9. The conductive path according to claim 8, wherein
   the shield member is a braided member connected to the connector, and
   the braided member is connected to the opening of the pipe by a metallic band.

10. The conductive path according to claim 1, wherein a cross-section of at least one junction portion is in a shape of a semi-circle.

11. The conductive path according to claim 1, wherein a cross-section of at least one junction portion has a substantially rectangular or square shape.

12. The conductive path according to claim 1, wherein a cross-section of at least one junction portion has a substantially triangular shape.

* * * * *